Patented July 9, 1940

2,207,624

UNITED STATES PATENT OFFICE 2,207,624

THERMOSETTING RESIN REACTION PRODUCT OF FURFURAL WITH AN OXY-NAPHTHENIC ACID

Donald D. Lee, Berkeley, Calif., assignor to Standard Oil Company of California, San Francisco, Calif., a corporation of Delaware No Drawing. Application June 17, 1938,
Serial No. 214,342

9 Claims. (Cl. 260—67)

This invention relates to synthetic resins derived from the reaction of furfural with oxy-naphthenic acids, to the method of producing the same and to plastic compositions comprising the same.

More particularly, the invention pertains to a thermosetting resin produced by the interaction of furfural in an acid medium with substantially saturated oxy-carboxylic acids of apparently naphthenic type which are produced in the oxidation of natural petroleum distillates of boiling range not substantially above the kerosenes and lower boiling gas oils.

The broad object of my invention is to provide a new synthetic resin of desirable characteristics for use in moldable plastic combinations and in liquid coating compositions.

A more specific object of the invention is to provide new thermosetting resin compositions of extreme durability, low reactivity and low solubility in most ordinary solvents.

Another object of this invention is to provide a synthetic thermosetting resin derived from the interaction of furfural with oxy-carboxylic naphthenic acids derived from petroleum.

Another object of the invention is to provide a synthetic resin of desirable characteristics and a simple and economical method for its production from raw materials that are widely available in substantially unlimited quantity.

Other objects of my invention will be readily apparent from the description and discussion which follow.

Furfural, $C_4H_3O.CHO$, has long been known as a chemical compound and has now come to be recognized as a basic raw material being widely available at low cost from the dilute acid hydrolysis of hemi-celluloses, glucosides, etc., occurring in many vegetable materials. For use in the present invention the product of average commercial purity, or when redistilled, is quite satisfactory.

As is well known in the petroleum industry a wide variety of oxygenated products may be prepared by subjecting petroleum hydrocarbons to oxidation under appropriately controlled conditions, the nature of the product being determined both by the nature of the hydrocarbons oxidized and the conditions of oxidation.

In the earlier attempts to produce valuable oxidation products from petroleum, fractions of rather wide boiling range were submitted to drastic and substantially uncontrolled oxidation in the vapor phase either over a powerful catalyst or by partial combustion. The result was invariably a product composed of many different types of compounds and a wide range of homologues of each type. Such products were of little chemical significance due to their extreme complexity and the difficulty of separating individual compounds or even types of compounds from them.

In more recent work the oxidation of petroleum distillate fractions of relatively narrow boiling range under more moderate conditions susceptible of better control has resulted in the production of far less complex mixtures of oxidation products that can be practically separated into individual compounds or compounds of but a single type which may then be employed per se or as chemical raw materials as desired. For instance, when a kerosene distillate is oxidized in substantially liquid phase with air at atmospheric pressure or pressures of 200 to 300 pounds per square inch and at a temperature of about 300° to 350° F. a product consisting largely of organic acids of substantially the same structure or at least the same carbon content as the hydrocarbon material oxidized may be prepared. These acids while usually mixtures of several homologues are of the same general character as the naphthenic acids naturally occurring in the distillate treated. They are substantially saturated, contain a carboxyl group and may contain one or more additional oxygen atoms depending upon the extent to which the oxidation has been carried. Under appropriately controlled conditions these additional oxygen atoms are present for the most part in hydroxy groups.

I have now discovered that when such acids prepared by the mild oxidation of kerosene, solar oil, light gas oil or other petroleum distillates are reacted with furfural in the presence of an acidic catalyst resinous products are produced, as more fully hereinafter explained, which have valuable properties for use in liquid coating compositions and in moldable thermosetting plastic compositions.

When a natural kerosene distillate consisting largely of hydrocarbons having from about 10 to 15 carbon atoms per molecule is oxidized in substantially liquid phase with air or an equivalent oxygen supplying agent at a temperature of about 300° to 350° F. and atmospheric or moderately elevated pressure, the oxidation reaction proceeds smoothly and the product of oxidation consists largely of carboxylic acids. These acids contain from two to five or more atoms of oxygen per molecule depending upon the extent to which the oxidation is carried. Ordinarily, some acids containing only two oxygen atoms, as a carboxyl group, and corresponding closely to the well known naphthenic acids occurring naturally in petroleum, are present along with acids of higher oxygen content in which from one to three or more oxygen atoms are present as hydroxyl groups in addition to the carboxyl group. In the description and discussion which follow and in the appended claims, the former will be referred to merely as naphthenic acids and the latter as oxycarboxylic naphthenic acids or merely as oxy-naphthenic acids.

The naphthenic acids are substantially more soluble in a light petroleum distillate such as petroleum ether or light gasoline than are the oxy-acids and advantage may be taken of this fact in effecting their separation. Where a more rigorous separation is necessary or desirable advantage may be taken of the differential solubilities of an appropriate salt such as the copper, calcium or barium salt.

Of these synthetic acids only the oxy-naphthenic acids react with furfural producing a resinous or resin-forming product, and I have found that the best acids for use in the practice of my invention are the oxy-acids having from one to three hydroxyl groups or mixtures in which such oxy-acids predominate. For instance, I have produced a thermosetting resin of very good quality by reacting with furfural an oxy-acid product corresponding approximately to the empirical formula $C_{14}H_{25}O_5$. Acids corresponding to the formulae $C_{12}H_{20}O_3$ and $C_{13}H_{23}O_3$ have also been used with good success. These formulae are based on combustion analyses and molecular weights by the cryoscopic method and hence, as will be readily appreciated by those skilled in the art, may not be taken as more than approximate. I believe, however, that they are adequately reliable for the illustrative purpose here intended.

Usually I prefer to employ acids having at least one oxygen atom more than required by the carboxyl group and ten or more carbon atoms per molecule though acids of lower molecular weight as for instance those containing eight or nine carbon atoms may be better suited to the production of resins having certain special combinations of characteristics. In other words, acids having a molecular weight between about 160 and 260 and an oxygen content of from 20 to 35% by weight in which the oxygen is present largely in carboxyl and hydroxyl groups will be found suitable for the production of a good grade of resin.

These acids are reacted with furfural in the presence of a mineral or strong organic acid catalyst at temperatures moderately above atmospheric as for instance 200°–220° F., in any appropriate form of apparatus, preferably one equipped with adequate stirring means and constructed of material which is not attacked by the reaction mixture and does not adversely affect the color of the product. To the best of my present knowledge the fundamental resin forming reaction involves equimolar quantities of furfural and acid and hence would require roughly 5 parts by weight of acids of the above molecular weight to 2 parts of furfural.

When the resin being produced is to be used in molding compositions and in other service wherein a product of maximum hardness and minimum solubility is required it has been found 'esirable to adhere as closely as practical to the proportions of one molecule of acid to one of furfural. When, however, a resin for use in coating compositions and other services requiring appreciable ductility is desired, acid slightly in excess of the 1:1 ratio may be employed in order that the unreacted acid may serve as a plasticizer. An excess of from 1 to about 15% will be found suitable in this regard.

As the acidic condensation catalyst I have found that 5%, based on the weight of the reactants, of 18% aqueous hydrochloric acid is well suited to the reaction contemplated. Other proportions and concentrations may, however, be used with advantage under other conditions of reaction and other strong acids generally known to be effective in promoting organic condensation reactions may be employed if desired. For instance, sulfuric, phosphoric, hydrobromic, arylsulfonic, acetic and trichloracetic acids or substances which react strongly acid such as aluminum chloride, stannic chloride and the like will be found more or less suitable.

In carrying out the reaction, furfural, oxy-naphthenic acid and acidic catalyst in the desired proportions, as above indicated, are thoroughly mixed and heated in an appropriate container at 200° to 220° F., preferably with constant stirring to insure a homogeneous product. No evidence of reaction is apparent at first but after several minutes, usually between 15 and 60 depending upon the exact conditions employed, the reaction mass will be seen suddenly to gel if unstirred or to assume a crepe-rubber-like consistency if being stirred. This stage of the reaction is substantially complete in about one minute under the temperature conditions given and when complete the resin is entirely formed and is substantially infusible and insoluble in most organic solvents. Only a relatively small further decrease in solubility and fusibility is produced by even long periods of additional heating. If, however, the reaction is interrupted by quick cooling just after the reaction mixture has begun to show a rapid increase in viscosity the resin product will not have reached the point of substantial infusibility and is hence particularly adapted to mixing with fillers, pigments and the like for the preparation of molded objects, the final infusible stage then being attained in the mold or on subsequent heating as may be desired. While the exact point at which the reaction should be interrupted in order to secure best results in this regard will vary somewhat with the temperature of the reaction, the proportion of reactants and particularly the catalyst employed, it can be determined by a few simple preliminary tests for any given set of conditions and can thereafter be reproduced without difficulty by means of careful timing.

The effectiveness of the acid catalyst can best be appreciated by reference to the following specific experiment. Two parts of oxy-naphthenic acid produced by the controlled oxidation of a California kerosene distillate was mixed with one part of commercial furfural and the mixture refluxed on a steam bath for a period of three days, at the end of which time the mixture had become intensely black but was scarcely more viscous than at the beginning of the experiment. Five per cent of 18% hydrochloric acid was then added to the mixture and the refluxing resumed, whereupon in less than thirty minutes the resin-forming reaction was completed and the reaction mass had become solid.

Since many organic reactions that are catalyzed by acids are also catalyzed by bases the action of alkaline catalysts in the resin-forming reaction between petroleum oxy-acids and furfural was investigated. It was found that under conditions comparable to those suitable for the reaction with an acid catalyst no reaction save polymerization of the furfural was effected by an alkaline catalyst.

In order further to study the nature of the reaction between furfural and oxy-naphthenic acids benzaldehyde, paraldehyde and formaldehyde were substituted for the furfural while keeping all other conditions constant. In no case, either with an acid or an alkaline catalyst, was any resin produced with these other aldehydes. The resin-forming reaction with furfural would appear therefore not to be a function of the aldehyde group per se.

The utility of the furfural-oxy-naphthenic acid resins of my invention is illustrated by the following specific experiment: 5 parts by weight of oxy-acid was mixed with 2 parts of furfural and digested with 5% of aqueous hydrochloric acid for between 18 and 20 minutes at which time the mass acquired a soft rubbery consistency. The product was then mixed with filler, fiber and pigment to give a moist mush composed of 30% resin, 45% wood flour, 2% flax fiber and 23% pigment. The resulting plastic mush was molded at 5000 to 8000 pounds per square inch, heated for about 6 minutes to 250°–300° F., cooled and removed from the mold. The molded product was hard, strong and cohesive without being brittle and required no further baking.

The resins formed from furfural and oxynaphthenic acid according to my invention are usually dark in color due to the well known tendency of furfural to produce color bodies. To the extent that this oxidation-polymerization product of the furfural alone may be avoided, resins of lighter color and hence a wider range of utility may be produced. Even without special precautions to avoid discoloration it is possible with the stronger red, green, etc., pigments to produce molded articles of very satisfactory color for most uses.

Having now described a new and useful synthetic resin derived from the reaction of oxynaphthetic acids with furfural and the conditions for its preparations and use I claim as my invention:

1. A synthetic thermosetting resin composition consisting of a reaction product of furfural with a saturated oxy-naphthenic acid.

2. A composition comprising a thermosetting resin reaction product of furfural with an oxynaphthetic acid.

3. A composition comprising a thermosetting resin reaction product of furfural with a naphthenic polyhydroxy-acid.

4. A composition comprising a thermosetting resin reaction product of furfural with a naphthenic hydroxy-carboxylic acid derived from petroleum having a molecular weight between about 160 and 260 and having an oxygen content of from 20 to 35% by weight, said oxygen being present largely in carboxyl and hydroxyl groups.

5. A moldable thermosetting plastic composition comprising a resin reaction product of furfural with an oxy-naphthenic acid and a filler.

6. A molded product comprising a thermosetting resin reaction product of furfural with an oxy-naphthenic acid derivative of petroleum, and a filler said molded product being substantially infusible, substantially insoluble in all ordinary organic solvents, hard, strong and cohesive without being brittle.

7. The process of producing a molded product which comprises preparing a plastic composition from a furfural-oxy-naphthenic acid resin and filler, compressing said plastic and heating to 250°–300° F. for a period of several minutes.

8. The method of producing a synethtic resin which comprises reacting furfural with an oxy-naphthenic acid derivative of petroleum at a temperature above atmospheric and in the presence of an acidic catalyst.

9. The method of producing a synthetic resin which comprises reacting furfural with a saturated hydroxy-naphthenic acid, of molecular weight between about 160 and 260, at a temperature of about 200° to 220° F. in the presence of about 5% by weight of 18% aqueous hydrochloric acid, the molecular proportions of furfural and hydroxy acid having about one to one.

DONALD D. LEE.

CERTIFICATE OF CORRECTION.

Patent No. 2,207,624. July 9, 1940.

DONALD D. LEE.

It is hereby certified that error appears in the printed specification of the above numbered patent requiring correction as follows: Page 3, second column, line 46, claim 9, for the word "having" read --being--; and that the said Letters Patent should be read with this correction therein that the same may conform to the record of the case in the Patent Office.

Signed and sealed this 24th day of December, A. D. 1940.

(Seal)

Henry Van Arsdale,
Acting Commissioner of Patents.